(12) United States Patent
Pallikkara Kuttiatoor et al.

(10) Patent No.: US 9,434,859 B2
(45) Date of Patent: Sep. 6, 2016

(54) CHEMICAL-MECHANICAL PLANARIZATION OF POLYMER FILMS

(71) Applicant: Cabot Microelectronics Corporation, Aurora, IL (US)

(72) Inventors: Sudeep Pallikkara Kuttiatoor, Aurora, IL (US); Renhe Jia, Naperville, IL (US); Jeffrey Dysard, St. Charles, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 135 days.

(21) Appl. No.: 14/035,037

(22) Filed: Sep. 24, 2013

(65) Prior Publication Data

US 2015/0083689 A1    Mar. 26, 2015

(51) Int. Cl.
*C09G 1/02*    (2006.01)
*B24B 1/00*    (2006.01)

(52) U.S. Cl.
CPC ...................................... *C09G 1/02* (2013.01)

(58) Field of Classification Search
USPC ...... 252/79.1, 9.4; 216/88, 89; 438/692, 693
See application file for complete search history.

(56) References Cited

U.S. PATENT DOCUMENTS

| | | | |
|---|---|---|---|
| 5,196,353 A | 3/1993 | Sandhu et al. | |
| 5,433,651 A | 7/1995 | Lustig et al. | |
| 5,609,511 A | 3/1997 | Moriyama et al. | |
| 5,643,046 A | 7/1997 | Katakabe et al. | |
| 5,658,183 A | 8/1997 | Sandhu et al. | |
| 5,730,642 A | 3/1998 | Sandhu et al. | |
| 5,838,447 A | 11/1998 | Hiyama et al. | |
| 5,872,633 A | 2/1999 | Holzapfel et al. | |
| 5,893,796 A | 4/1999 | Birang et al. | |
| 5,949,927 A | 9/1999 | Tang | |
| 5,964,643 A | 10/1999 | Birang et al. | |
| 6,610,114 B2 | 8/2003 | Towery et al. | |
| 6,830,503 B1 | 12/2004 | Grumbine | |
| 7,014,669 B2 * | 3/2006 | Small et al. | 51/307 |
| 7,087,530 B2 | 8/2006 | Motonari et al. | |
| 7,161,247 B2 | 1/2007 | De Rege Thesauro et al. | |
| 7,897,061 B2 | 3/2011 | Dysard et al. | |
| 7,942,945 B1 | 5/2011 | Zantye et al. | |
| 8,038,752 B2 * | 10/2011 | Carter | C09G 1/02 51/307 |
| 2001/0049912 A1 | 12/2001 | Motonari et al. | |
| 2003/0005647 A1 | 1/2003 | Towery et al. | |
| 2004/0144755 A1 | 7/2004 | Motonari et al. | |
| 2005/0003744 A1 * | 1/2005 | Feng et al. | 451/41 |
| 2006/0270235 A1 * | 11/2006 | Siddiqui et al. | 438/692 |
| 2007/0178700 A1 | 8/2007 | Dysard et al. | |
| 2008/0182485 A1 * | 7/2008 | Siddiqui et al. | 451/36 |
| 2012/0049107 A1 | 3/2012 | Park et al. | |
| 2014/0209566 A1 * | 7/2014 | Fu et al. | 216/53 |

* cited by examiner

*Primary Examiner* — Shamim Ahmed

(74) *Attorney, Agent, or Firm* — Thomas Omholt; Arlene Homilla; Ashlee B. Szelag

(57) ABSTRACT

The invention provides a chemical-mechanical polishing composition and a method of chemically-mechanically polishing a substrate with the chemical-mechanical polishing composition. The polishing composition comprises (a) abrasive particles that comprise ceria, zirconia, silica, alumina, or a combination thereof, (b) a metal ion that is a Lewis Acid, (c) a ligand that is an aromatic carboxylic acid, an aromatic sulfonic acid, an aromatic acid amide, an amino acid, or a hydroxy-substituted N-heterocycle, and (d) an aqueous carrier, wherein the pH of the chemical-mechanical polishing composition is in the range of about 1 to about 4.

13 Claims, No Drawings

US 9,434,859 B2

CHEMICAL-MECHANICAL PLANARIZATION OF POLYMER FILMS

BACKGROUND OF THE INVENTION

In the fabrication of integrated circuits and other electronic devices, multiple layers of conducting, semiconducting, and dielectric materials are deposited onto or removed from a substrate surface. Thin layers of conducting, semiconducting, and dielectric materials may be deposited onto the substrate surface by a number of deposition techniques. Deposition techniques common in modern microelectronics processing include physical vapor deposition (PVD), also known as sputtering, chemical vapor deposition (CVD), plasma-enhanced chemical vapor deposition (PECVD), and electrochemical plating (ECP).

As layers of materials are sequentially deposited onto and removed from the substrate, the uppermost surface of the substrate may become non-planar and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Compositions and methods for planarizing or polishing the surface of a substrate are well known in the art. Chemical-mechanical planarization, or chemical-mechanical polishing (CMP), is a common technique used to planarize substrates. CMP utilizes a chemical composition, known as a CMP composition or more simply as a polishing composition (also referred to as a polishing slurry) for selective removal of material from the substrate. Polishing compositions typically are applied to a substrate by contacting the surface of the substrate with a polishing pad (e.g., polishing cloth or polishing disk) saturated with the polishing composition. The polishing of the substrate typically is further aided by the chemical activity of the polishing composition and/or the mechanical activity of an abrasive suspended in the polishing composition or incorporated into the polishing pad (e.g., fixed abrasive polishing pad).

Silicon dioxide-based dielectric layers are frequently used to isolate metal-containing circuit lines formed on a substrate. Because the dielectric constant of silicon dioxide-based dielectric materials is relatively high, i.e., approximately 3.9 or higher (depending on factors such as residual moisture content), the capacitance between the conductive layers is also relatively high, which limits the speed (frequency) at which a circuit can operate. Interlevel dielectric (ILD) materials having lower dielectric constants relative to silicon dioxide can be used to provide electrical isolation and increase the frequency at which the circuit can operate. Polymer films have been considered for use as such ILD materials because they have relatively low dielectric constants and low intrinsic stress levels. Polymer films are also important in through-silica via (TSV) applications.

Methods of polishing polymer films employ the mechanical properties of abrasive particles to polish the polymer. Thus, removal rates are directly related to the hardness of the abrasive particle, the solid content level in the polishing composition, and the specific polishing conditions employed. To achieve a higher removal rate of the polymer film, hard abrasive particles, relatively high solid contents, and aggressive polishing conditions have been required. However, abrasive particles can cause several defects during polishing, including scratches on the surface of the polymer, which limit performance.

Thus, it would be highly desirable to have a chemical-mechanical polishing composition that employs the chemical properties of the composition to a more significant extent to polish polymer films, thereby avoiding the need for a high solids content while increasing the removal rate of the polymer film and exhibiting good defect performance. A need remains for a polishing composition and polishing methods that will exhibit desirable planarization efficiency, uniformity, and removal rate during the polishing and planarization of substrates containing polymer films, while minimizing defectivity, such as surface imperfections and damage to underlying structures and topography during polishing and planarization. The invention provides such a polishing composition and methods. These and other advantages of the invention, as well as additional inventive features, will be apparent from the description of the invention provided herein.

BRIEF SUMMARY OF THE INVENTION

The invention provides a chemical-mechanical polishing composition comprising (a) abrasive particles that comprise ceria, zirconia, silica, alumina, or a combination thereof, (b) a metal ion that is a Lewis Acid, (c) a ligand that is an aromatic carboxylic acid, an aromatic sulfonic acid, an aromatic acid amide, an amino acid, or a hydroxy-substituted N-heterocycle, and (d) an aqueous carrier, wherein the pH of the chemical-mechanical polishing composition is in the range of about 1 to about 4.

The invention further provides a method of polishing a substrate comprising (i) providing a substrate, such as a substrate comprising a polymer film; (ii) providing a polishing pad; (iii) providing a chemical-mechanical polishing composition comprising (a) abrasive particles that comprise ceria, zirconia, silica, alumina, or a combination thereof, (b) a metal ion that is a Lewis Acid, (c) a ligand that is an aromatic carboxylic acid, an aromatic sulfonic acid, an aromatic acid amide, an amino acid, or a hydroxy-substituted N-heterocycle, and (d) an aqueous carrier, wherein the pH of the chemical-mechanical polishing composition is in the range of about 1 to about 4; (iv) contacting the substrate with the polishing pad and the chemical-mechanical polishing composition, and (v) moving the polishing pad and the chemical-mechanical polishing composition relative to the substrate, such as the polymer film on a surface of the substrate, to abrade at least a portion of the substrate to polish the substrate.

DETAILED DESCRIPTION OF THE INVENTION

The invention provides a chemical-mechanical polishing composition comprising (a) abrasive particles that comprise ceria, zirconia, silica, alumina, or a combination thereof, (b) a metal ion that is a Lewis Acid, (c) a ligand that is an aromatic carboxylic acid, an aromatic sulfonic acid, an aromatic acid amide, an amino acid, or a hydroxy-substituted N-heterocycle, and (d) an aqueous carrier, wherein the pH of the chemical-mechanical polishing composition is in the range of about 1 to about 4.

The abrasive particles can be present in the polishing composition at any suitable concentration. Desirably, the polishing composition contains a low content of abrasive particles (i.e., a low solids content). A low solids content desirably allows for useful removal rates of the substrate being polished while minimizing defectivity and excessive removal rates of other components of the substrate observed with higher abrasive levels (e.g., greater than about 2 wt. %). For example, the abrasive particles can be present in the polishing composition at a concentration of about 0.01 wt. % or more, e.g., about 0.02 wt. % or more, about 0.025 wt. % or more, about 0.03 wt. % or more, about 0.04 wt. % or more, about 0.05 wt. % or more, about 0.075 wt. % or more, about 0.1 wt. % or more, about 0.25 wt. % or more, about 0.5 wt. % or more, or about 0.75 wt. % or more. Alternatively, or in addition, the abrasive particles can be present in the polishing composition at a concentration of about 2 wt. % or less, e.g., about 1.75 wt. % or less, about 1.5 wt. % or less, about 1.25 wt. % or less, or about 1 wt. % or less. Preferably, the abrasive particles are present in the polishing composition at a concentration of about 0.01 wt. % to about 1 wt. %, or about 0.01 wt. % to about 0.05 wt. %. More preferably, the abrasive particles are present in the polishing composition at a concentration of about 0.05 wt. %.

The abrasive particles can be any suitable abrasive particles. Preferably, the abrasive particles are metal oxide abrasive particles of ceria (e.g., cerium oxide), zirconia (e.g., zirconium oxide), silica (e.g., silicon dioxide), alumina (e.g., aluminum oxide), titania (e.g., titanium dioxide), germania (e.g., germanium dioxide, germanium oxide), magnesia (e.g., magnesium oxide), co-formed products thereof, or combinations thereof. More preferably, the abrasive particles comprise, consist essentially of, or consist of ceria, zirconia, silica, alumina, or a combination thereof. Even more preferably, the abrasive particles comprise ceria. Most preferably, the abrasive particles consist of ceria, and the chemical-mechanical polishing composition does not comprise other abrasive particles.

The metal oxide particles can be any suitable type of metal oxide particles, e.g., fumed metal oxide particles, precipitated metal oxide particles, or condensation-polymerized metal oxide particles (e.g., colloidal metal oxide particles). Preferably, the metal oxide particles, especially ceria particles, are wet-process particles (e.g., condensation-polymerized or precipitated particles), and are not calcined particles.

The metal oxide particles, especially ceria, zirconia, silica, and alumina particles, can have any suitable particle size. The particle size of a particle is the diameter of the smallest sphere that encompasses the particle. The metal oxide particles can have an average particle size of about 10 nm or more, e.g., about 15 nm or more, about 20 nm or more, about 25 nm or more, about 35 nm or more, about 45 nm or more, about 50 nm or more, about 55 nm or more, about 60 nm or more, about 75 nm or more, or about 100) nm or more. Alternatively, or in addition, the metal oxide particles can have an average particle size of about 250 nm or less, e.g., about 225 nm or less, about 200 nm or less, about 175 nm or less, about 160 nm or less, about 150 nm or less, about 125 nm or less, about 115 nm or less, about 100 nm or less, about 90) nm or less, or about 80 nm or less. For example, the ceria, zirconia, silica, and alumina particles can have an average particle size of about 25 nm to about 250 nm. e.g., about 35 nm to about 200 nm, about 45 nm to about 150 nm, about 50 nm to about 125 nm, about 55 nm to about 120 nm, or about 60 nm to about 115 nm.

The abrasive particles desirably are suspended in the polishing composition, more specifically in the aqueous carrier of the polishing composition. When the abrasive particles are suspended in the polishing composition, the abrasive particles preferably are colloidally stable. The term colloid refers to the suspension of abrasive particles in the aqueous carrier. Colloidal stability refers to the maintenance of that suspension over time. In the context of this invention, abrasive particles are considered colloidally stable if, when the abrasive particles are placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). The value of $[B]-[T]/[C]$ desirably is less than or equal to 0.3, and preferably is less than or equal to 0.1.

The polishing composition includes a metal ion that is a Lewis Acid. In particular, the polishing composition includes one or more metal ions that are Lewis Acids. By "metal ion that is a Lewis Acid." it is meant that the metal ion has the ability to accept an electron and enter a reduced state. In other words, the metal ion that is a Lewis Acid has an electron affinity. For example, the metal ion that is a Lewis Acid can be $Fe^{3+}$, $Al^{3+}$, $Cu^{2+}$, $Zn^{2+}$, or a combination thereof. Preferably, the metal ion that is a Lewis Acid is $Fe^{3+}$, $Al^{3+}$, or a combination thereof.

The metal ion that is a Lewis Acid can be present in the polishing composition at any suitable concentration, and can be present in any suitable form. For example, the metal ion that is a Lewis Acid (i.e., all of the metal ions that are Lewis Acids in total) can be present in the polishing composition at a concentration of about 0.05 mM or more, e.g., about 0.075 mM or more, about 0.1 mM or more, about 0.15 mM or more, about 0.2 mM or more, about 0.3 mM or more, about 0.4 mM or more, about 0.5 mM or more, about 0.75 mM or more, about 1 mM or more, about 2 mM or more, about 3 mM or more, about 4 mM or more, or about 5 mM or more. Alternatively, or in addition, the metal ion that is a Lewis Acid (i.e., all of the metal ions that are Lewis Acids in total) can be present in the polishing composition at a concentration of about 50 mM or less, e.g., about 45 mM or less, about 40 mM or less, about 35 mM or less, about 30 mM or less, about 25 mM or less, about 20 mM or less, about 15 mM or less, about 10 mM or less, about 5 mM or less, about 4 mM or less, about 3 mM or less, or about 2.5 mM or less. Preferably, the metal ion that is a Lewis Acid is (i.e., all of the metal ions that are Lewis Acids in total are) present in the polishing composition at a concentration of about 0.05 mM to about 50 mM, e.g., about 1 mM to about 45 mM, about 2 mM to about 35 mM, about 3 mM to about 25 mM, about 4 mM to about 15 mM, or about 5 mM to about 10 mM.

The polishing composition further comprises a ligand that is an aromatic carboxylic acid, an aromatic sulfonic acid, an aromatic acid amide, an amino acid, or a hydroxy-substituted N-heterocycle. In particular, the polishing composition includes one or more ligands that are aromatic carboxylic acids, aromatic sulfonic acids, aromatic acid amides, amino acids, or hydroxy-substituted N-heterocycles. The ligand is any suitable aromatic carboxylic acid, aromatic sulfonic acid, aromatic acid amide, amino acid, or hydroxy-substituted N-heterocycle that enhances the removal rate of the substrate layer being removed. Preferably, when the ligand is an aromatic carboxylic acid, an aromatic sulfonic acid, or an aromatic acid amide, the acid functional group of the ligand is directly attached to the aromatic ring of the ligand. Although not wishing to be bound by any particular theory, it is believed that when the acid functional group is directly attached to the aromatic ring, the activity level of the ligand is increased, thereby enhancing the removal rate of the substrate being polished.

For example, the ligand may be picolinic acid (e.g., 2-picolinic acid), isonicotinic acid, nicotinic acid, pyridinedicarboxylic acid (e.g., 2,6-pyridinedicarboxylic acid), pyridine sulfonic acid (e.g., 2-pyridine sulfonic acid), p-toluenesulfonic acid, salicylamide, aniline sulfonic acid, methylglycine, phenylglycine (e.g., 2-phenylglycine), dimethylglycine (e.g., N,N-dimethylglycine or 2-dimethylglycine), aminobenzoic acid (e.g., 4-aminobenzoic acid), pipecolinic acid, proline, 2-hydroxypyridine, 8-hydroxyquinoline, 2-hydroxyquinoline, or a combination thereof. Preferably, the ligand is picolinic acid. Of course, ligands suitable for use in the invention are not limited to the particular examples disclosed herein. For example, other heterocyclic compounds with binding constants similar to the binding constants of the hydroxy-substituted N-heterocycles disclosed herein (i.e., heterocyclic compounds with binding constants similar to 2-hydroxyquinoline, 8-hydroxyquinoline, and 2-hydroxypyridine) also are suitable for use in the invention.

The ligand that is an aromatic carboxylic acid, an aromatic sulfonic acid, an aromatic acid amide, an amino acid, or a hydroxy-substituted N-heterocycle can be present in the polishing composition in any suitable concentration. For example, the ligand that is an aromatic carboxylic acid, an aromatic sulfonic acid, an aromatic acid amide, an amino acid, or a hydroxy-substituted N-heterocycle (i.e., all of the ligands that are aromatic carboxylic acids, aromatic sulfonic acids, aromatic acid amides, amino acids, or hydroxy-substituted N-heterocycles in total) can be present in the polishing composition at a concentration of about 0.1 mM or more, e.g., about 0.5 mM or more, about 1 mM or more, about 1.5 mM or more, about 2 mM or more, about 2.5 mM or more, about 3 mM or more, about 4 mM or more, about 5 mM or more, about 7.5 mM or more or about 10 mM or more. Alternatively, or in addition, the ligand that is an aromatic carboxylic acid, an aromatic sulfonic acid, an aromatic acid amide, an amino acid, or a hydroxy-substituted N-heterocycle (i.e., all of the ligands that are aromatic carboxylic acids, aromatic sulfonic acids, aromatic acid amides, amino acids, or hydroxy-substituted N-heterocycles in total) can be present in the polishing composition at a concentration of about 100 mM or less, e.g., about 90 mM or less, about 80 mM or less, about 75 mM or less, about 65 mM or less, about 50 mM or less, about 40 mM or less, about 35 mM or less, about 25 mM or less, about 20 mM or less, or about 15 mM or less. Preferably, the ligand that is an aromatic carboxylic acid, an aromatic sulfonic acid, an aromatic acid amide, an amino acid, or a hydroxy-substituted N-heterocycle is (i.e., all of the ligands that are aromatic carboxylic acids, aromatic sulfonic acids, aromatic acid amides, amino acids, or hydroxy-substituted N-heterocycles in total are) present in the polishing composition at a concentration of about 0.1 mM to about 100 mM, e.g., about 0.5 mM to about 75 mM, about 1 mM to about 50 mM, about 5 mM to about 25 mM, about 10 mM to about 20 mM, or about 10 mM to about 15 mM.

Desirably, the molar concentration ratio of the metal ion that is a Lewis Acid (i.e., all of the metal ions that are Lewis Acids in total) to the ligand that is an aromatic carboxylic acid, an aromatic sulfonic acid, an aromatic acid amide, an amino acid, or a hydroxy-substituted N-heterocycle (i.e., all of the ligands that are aromatic carboxylic acids, aromatic sulfonic acids, aromatic acid amides, amino acids, or hydroxy-substituted N-heterocycles in total) is between about 1:about 2 and about 1:about 0.5. In other words, the molar concentration ratio of the metal ion that is a Lewis Acid (i.e., all of the metal ions that are Lewis Acids in total) to the ligand that is an aromatic carboxylic acid, an aromatic sulfonic acid, an aromatic acid amide, an amino acid, or a hydroxy-substituted N-heterocycle (i.e., all of the ligands that are aromatic carboxylic acids, aromatic sulfonic acids, aromatic acid amides, amino acids, or hydroxy-substituted N-heterocycles in total) can be about 1:about 2, about 1:about 1.5, about 1:about 1, or about 1:about 0.5. Preferably, the molar concentration ratio of the metal ion that is a Lewis Acid (i.e., all of the metal ions that are Lewis Acids in total) to the ligand that is an aromatic carboxylic acid, an aromatic sulfonic acid, an aromatic acid amide, an amino acid, or a hydroxy-substituted N-heterocycle (i.e., all of the ligands that are aromatic carboxylic acids, aromatic sulfonic acids, aromatic acid amides, amino acids, or hydroxy-substituted N-heterocycles in total) is about 1:about 2.

Although not wishing to be bound by any particular theory, it is believed that the metal ion that is a Lewis Acid and the ligand that is an aromatic carboxylic acid, an aromatic sulfonic acid, an aromatic acid amide, an amino acid, or a hydroxy-substituted N-heterocycle form a weak metal complex that interacts with the surface of a polymer film and initiates the oxidation process to enhance the removal rate of the polymer film during the CMP process. In particular, it is believed that the interactions between the metal ion, the ligand, and the polymer film can be represented as follows:

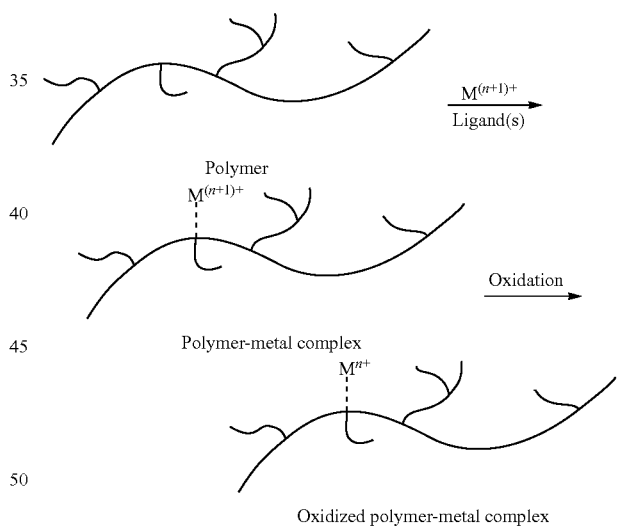

In the above diagram, $M^{(n+1)+}$ represents the metal ion prior to its acceptance of an electron, and $M^{n+}$ represents the metal ion in a reduced state after acceptance of an electron. The polymer-metal complex can include one or more covalent bonds, coordination bonds, complex bonds, ionic bonds, and p bonds. The oxidized polymer-metal complex that is formed according to the above reaction scheme is more easily removed by chemical-mechanical polishing, allowing for a lower solids content while increasing removal rate.

As can be seen from the above diagram, it is believed that the metal complex itself acts as an oxidizer during polishing of a polymer film. Thus, although the polishing composition optionally can further comprise an additional oxidizing agent (e.g., a peroxy-type oxidizer), the present invention desirably avoids the need to include an additional oxidizing agent (e.g., a peroxy-type oxidizer) in the polishing composition. A peroxy-type oxidizer is any oxidizer with at least one peroxy (—O—O—) group. For example, a peroxy-type oxidizer is an organic peroxide, inorganic peroxide, or combination thereof. Examples of compounds containing at least one peroxy group include, but are not limited to, hydrogen peroxide and its adducts such as urea hydrogen peroxide and percarbonates (e.g., sodium percarbonate), organic peroxides such as benzoyl peroxide, peracetic acid, perboric acid, and di-tert-butyl peroxide, monopersulfates ($SO_5^{2-}$), dipersulfates ($S_2O_8^{2-}$), and sodium peroxide. Preferably, the chemical-mechanical polishing composition does not contain a peroxy-type oxidizer.

The polishing composition includes an aqueous carrier. The aqueous carrier contains water (e.g., deionized water) and may contain one or more water-miscible organic solvents. Examples of organic solvents that can be used include alcohols such as propenyl alcohol, isopropyl alcohol, ethanol, 1-propanol, methanol, 1-hexanol, and the like; aldehydes such as acetaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N, N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. Preferably, the aqueous carrier is water alone, i.e., without the presence of an organic solvent.

The polishing composition can have any suitable pH. Typically, the polishing composition has a pH of about 1 or greater. The pH of the polishing composition typically is about 4 or less. Preferably, the pH is in the range of about 1 to about 4, e.g., a pH of about 1.5, a pH of about 2, a pH of about 2.5, a pH of about 3, a pH of about 3.5, or a pH in a range defined by any two of these pH values.

Preferably, when the ligand is an aromatic carboxylic acid, an aromatic sulfonic acid, an aromatic acid amide, or a hydroxy-substituted N-heterocycle, the pH of the polishing composition is in the range of about 2 to about 3 (e.g., the pH of the polishing composition is about 2.3, or the pH of the polishing composition is about 2.5). Preferably, when the ligand is an amino acid, the pH of the polishing composition is in the range of about 2 to about 3 (e.g., the pH of the polishing composition is about 2.3, about 2.5, about 2.6, or about 2.7), or is in the range of about 2.5 to about 3.5. More preferably, when the ligand is an amino acid, the pH of the polishing composition is in the range of about 3 to about 3.5.

The pH of the polishing composition can be achieved and/or maintained by any suitable means. More specifically, the polishing composition can further comprise a pH adjustor, a pH buffering agent, or a combination thereof. The pH adjustor can be any suitable pH-adjusting compound. For example, the pH adjustor can be an acid. The acid can be any suitable acid. Typically, the acid is acetic acid, nitric acid, phosphoric acid, oxalic acid, and combinations thereof. Preferably, the acid is nitric acid. The pH adjustor alternatively can be a base. The base can be any suitable base. Typically, the base is potassium hydroxide, ammonium hydroxide, and combinations thereof. Preferably, the base is ammonium hydroxide. The pH buffering agent can be any suitable buffering agent. For example, the pH buffering agent can be a phosphate, sulfate, acetate, borate, ammonium salt, and the like. The polishing composition can comprise any suitable amount of a pH adjustor and/or a pH buffering agent, provided that a suitable amount is used to achieve and/or maintain the pH of the polishing composition within the pH ranges set forth herein.

The polishing composition optionally further comprises one or more corrosion inhibitors (i.e., film-forming agents). The corrosion inhibitor can be any suitable corrosion inhibitor for any component(s) of the substrate. Preferably, the corrosion inhibitor is a copper-corrosion inhibitor. For the purposes of this invention, a corrosion inhibitor is any compound, or mixture of compounds, that facilitates the formation of a passivation layer (i.e., a dissolution-inhibiting layer) on at least a portion of the surface being polished. Suitable corrosion inhibitors include, but are not limited to, lysine, and azole compounds, such as benzotriazole (BTA), methyl-benzotriazole (m-BTA), and 1,2,4-triazole (TAZ). Preferably, the corrosion inhibitor is BTA or lysine.

The polishing composition can comprise any suitable amount of the corrosion inhibitor(s). Generally, the polishing composition comprises about 0.005 wt. % to about 1 wt. % (e.g., about 0.01 to about 0.5 wt. %, or about 0.02 to about 0.2 wt. %) of the corrosion inhibitor(s).

The polishing composition optionally further comprises one or more other additives. The polishing composition can comprise a surfactant and/or rheological control agent, including viscosity enhancing agents and coagulants (e.g., polymeric rheological control agents, such as, for example, urethane polymers), a dispersant, a biocide (e.g., KATHON™ LX), and the like. Suitable surfactants include, for example, cationic surfactants, anionic surfactants, anionic polyelectrolytes, nonionic surfactants, amphoteric surfactants, fluorinated surfactants, mixtures thereof, and the like.

The polishing composition can be prepared by any suitable technique, many of which are known to those skilled in the art. The polishing composition can be prepared in a batch or continuous process. Generally, the polishing composition can be prepared by combining the components herein in any order. The term "component" as used herein includes individual ingredients (e.g., abrasive particles, a metal ion that is a Lewis Acid, a ligand that is an aromatic carboxylic acid, an aromatic sulfonic acid, an aromatic acid amide, or an amino acid, etc.) as well as any combination of ingredients (e.g., abrasive particles, a metal ion that is a Lewis Acid, a ligand that is an aromatic carboxylic acid, an aromatic sulfonic acid, an aromatic acid amide, or an amino acid, etc.).

For example, the metal ion that is a Lewis Acid and the ligand that is an aromatic carboxylic acid, an aromatic sulfonic acid, an aromatic acid amide, an amino acid, or a hydroxy-substituted N-heterocycle, can be mixed together in water at the desired concentrations. The pH can then be adjusted (as necessary) to be in the range of about 1 to about 4, and abrasive particles (e.g., ceria, zirconia, silica, alumina, or a combination thereof) can be added to the mixture at the desired concentration to form the polishing composition. The polishing composition can be prepared prior to use, with one or more components added to the polishing composition just before use (e.g., within about 1 minute before use, or within about 1 hour before use, or within about 7 days before use). The polishing composition also can be prepared by mixing the components at the surface of the substrate during the polishing operation.

The polishing composition of the invention also can be provided as a concentrate which is intended to be diluted with an appropriate amount of the aqueous carrier, particularly water, prior to use. In such an embodiment, the polishing composition concentrate can comprise abrasive particles, the metal ion that is a Lewis Acid, the ligand that is an aromatic carboxylic acid, an aromatic sulfonic acid, an aromatic acid amide, an amino acid, or a hydroxy-substituted N-heterocycle, and water, in amounts such that, upon dilution of the concentrate with an appropriate amount of water, each component of the polishing composition will be present in the polishing composition in an amount within the appropriate range recited above for each component. Furthermore, as will be understood by those of ordinary skill in the art, the concentrate can contain an appropriate fraction of the water present in the final polishing composition in order to ensure that other components are at least partially or fully dissolved in the concentrate.

While the polishing composition can be prepared well before, or even shortly before, use, the polishing composition also can be produced by mixing the components of the polishing composition at or near the point-of-use. As utilized herein, the term "point-of-use" refers to the point at which the polishing composition is applied to the substrate surface (e.g., the polishing pad or the substrate surface itself). When the polishing composition is to be produced using point-of-use mixing, the components of the polishing composition are separately stored in two or more storage devices.

In order to mix components contained in storage devices to produce the polishing composition at or near the point-of-use, the storage devices typically are provided with one or more flow lines leading from each storage device to the point-of-use of the polishing composition (e.g., the platen, the polishing pad, or the substrate surface). By the term "flow line" is meant a path of flow from an individual storage container to the point-of-use of the component stored therein. The one or more flow lines can each lead directly to the point-of-use, or, in the situation where more than one flow line is used, two or more of the flow lines can be combined at any point into a single flow line that leads to the point-of-use. Furthermore, any of the one or more flow lines (e.g., the individual flow lines or a combined flow line) can first lead to one or more of the other devices (e.g., pumping device, measuring device, mixing device, etc.) prior to reaching the point-of-use of the component(s).

The components of the polishing composition can be delivered to the point-of-use independently (e.g., the components are delivered to the substrate surface whereupon the components are mixed during the polishing process), or the components can be combined immediately before delivery to the point-of-use. Components are combined "immediately before delivery to the point-of-use" if they are combined less than 10 seconds prior to reaching the point-of-use, preferably less than 5 seconds prior to reaching the point-of-use, more preferably less than 1 second prior to reaching the point of use, or even simultaneous to the delivery of the components at the point-of-use (e.g., the components are combined at a dispenser). Components also are combined "immediately before delivery to the point-of-use" if they are combined within 5 m of the point-of-use, such as within 1 m of the point-of-use or even within 10 cm of the point-of-use (e.g., within 1 cm of the point of use).

When two or more of the components of the polishing composition are combined prior to reaching the point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternatively, the mixing device can be a container-type mixing device comprising one or more inlets by which two or more components of the polishing composition are introduced to the mixer, and at least one outlet through which the mixed components exit the mixer to be delivered to the point-of-use, either directly or via other elements of the apparatus (e.g., via one or more flow lines). Furthermore, the mixing device can comprise more than one chamber, each chamber having at least one inlet and at least one outlet, wherein two or more components are combined in each chamber. If a container-type mixing device is used, the mixing device preferably comprises a mixing mechanism to further facilitate the combination of the components. Mixing mechanisms are generally known in the art and include stirrers, blenders, agitators, paddled baffles, gas sparger systems, vibrators, etc.

The invention also provides a method of polishing a substrate with the polishing composition described herein. The method of polishing a substrate comprises (i) providing a substrate; (ii) providing a polishing pad; (iii) providing the aforementioned chemical-mechanical polishing composition; (iv) contacting the substrate with the polishing pad and the chemical-mechanical polishing composition; and (v) moving the polishing pad and the chemical-mechanical polishing composition relative to the substrate to abrade at least a portion of the substrate to polish the substrate.

In particular, the invention further provides a method of chemically-mechanically polishing a substrate comprising (i) providing a substrate; (ii) providing a polishing pad; (iii) providing a chemical-mechanical polishing composition comprising (a) abrasive particles that comprise ceria, zirconia, silica, alumina, or a combination thereof, (b) a metal ion that is a Lewis Acid, (c) a ligand that is an aromatic carboxylic acid, an aromatic sulfonic acid, an aromatic acid amide, an amino acid, or a hydroxy-substituted N-heterocycle, and (d) an aqueous carrier, wherein the pH of the chemical-mechanical polishing composition is in the range of about 1 to about 4; (iv) contacting the substrate with the polishing pad and the chemical-mechanical polishing composition; and (v) moving the polishing pad and the chemical-mechanical polishing composition relative to the substrate to abrade at least a portion of the substrate to polish the substrate.

The polishing composition of the invention is useful for polishing any suitable substrate. The polishing composition is particularly useful in the polishing of a substrate comprising a polymer film. Suitable substrates include semiconductors, inter-layer dielectric (ILD) layers, microelectromechanical systems (MEMS), memory elements such as dynamic random access memory (DRAM) and NAND memory, optical waveplates, and substrates comprising anti-reflective coatings (ARC). Suitable polymer films can comprise a polymer such as, for example, polyimide, fluorinated polyimide, spin-on carbon (SoC) polymer, polyarylenes and polyarylene ethers (such as SiLK™ from Dow Chemical, FLARE™ from Allied Signal, and VELOX™ from Schumacher), polybenzoxazole (PBO), polybenzocyclobutene, divinyl siloxane bisbenzocyclobutene (DVS-BCB), polytetrafluoroethylene (PTFE), polysiloxane, polynaphthylene ether, polyquinolines, paralynes (such as Parylene AF4, an aliphatic tetrafluorinated poly-p-xylylene), copolymers thereof, and combinations thereof.

The substrate may comprise a polymer film layer and one or more additional layers that are different from the polymer film layer. The additional layer or layers typically comprise an oxide (e.g., silicon dioxide ($SiO_2$)), tetraethoxysilane (TEOS), silicon nitride, copper, tantalum, tungsten, titanium, platinum, ruthenium, iridium, aluminum, nickel, or combinations thereof, or other high- or low-v dielectric materials. Desirably, the polishing composition of the invention exhibits useful removal rates for a polymer film layer while minimizing removal rates of other components of the substrate, such as silicon dioxide layer(s), TEOS layer(s), and silicon nitride layer(s). In particular, when a polymer film layer is deposited on an interlevel dielectric (ILD), the polishing composition of the invention desirably polishes the polymer film layer while exhibiting minimal (or no) polishing of oxide layers, TEOS layers, or silicon nitride layers.

In accordance with the invention, a substrate can be planarized or polished with the polishing composition described herein by any suitable technique. The polishing methods of the invention are particularly suited for use in conjunction with a chemical-mechanical polishing (CMP) apparatus. Typically, the CMP apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing composition of the invention and typically a polishing pad and then abrading at least a portion of the surface of the substrate, e.g., the polymer film, or one or more of the substrate materials described herein, with the polishing composition and typically the polishing pad to polish the substrate. Any suitable polishing conditions can be used to polish a substrate according to the invention. Desirably, the invention makes it possible to achieve high polymer removal rates without aggressive polishing conditions. Preferably, the down force, i.e., the force with which the substrate contacts the polishing pad with the polishing composition, can be been about 6.89 kPa (1 psi) to about 41.37 kPa (6 psi), the platen speed can be about 15 rpm to about 120 rpm, the head speed can be about 10 rpm to about 115 rpm, and the polishing composition flow can be about 100 mL/min to about 400 mL/min.

A substrate can be planarized or polished with the chemical-mechanical polishing composition in conjunction with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353, U.S. Pat. No. 5,433,651, U.S. Pat. No. 5,609,511, U.S. Pat. No. 5,643,046, U.S. Pat. No. 5,658,183, U.S. Pat. No. 5,730,642, U.S. Pat. No. 5,838,447, U.S. Pat. No. 5,872,633, U.S. Pat. No. 5,893,796, U.S. Pat. No. 5,949,927, and U.S. Pat. No. 5,964,643. Desirably, the inspection or monitoring of the progress of the polishing process with respect to a workpiece being polished enables the determination of the polishing end-point, i.e., the determination of when to terminate the polishing process with respect to a particular workpiece.

EXAMPLES

The following examples further illustrate the invention but, of course, should not be construed as in any way limiting its scope.

Example 1

This example demonstrates the effectiveness of the combination of a metal ion that is a Lewis Acid and a ligand that is an aromatic carboxylic acid, an aromatic sulfonic acid, an aromatic acid amide, an amino acid, or a hydroxy-substituted N-heterocycle, on the removal rate of polymer film.

Spin-on carbon (SoC) polymer wafers were polished with different polishing compositions using a conventional CMP apparatus. The wafers were polished with seven polishing compositions (Polishing Compositions 1A-1G), each polishing composition containing a metal ion alone, a ligand alone, or both a metal ion and a ligand, as described in Table 1, below.

Each of Polishing Compositions 1A-1G contained 0.05 wt. % ceria particles in an aqueous carrier and was adjusted to pH 2.3 as necessary with ammonium hydroxide. Polishing Compositions 1A and 1B contained 5 mM $Al^{3+}$, Polishing Compositions 1C and 1D contained 5 mM $Fe^{3+}$, and Polishing Compositions 1E and 1F contained 5 mM $Cu^{2+}$. Polishing Compositions 1B, 1D, 1F, and 1G contained 10 mM picolinic acid.

The substrates were polished on a Logitech tabletop polisher with an EPIC™ D200 pad (Cabot Microelectronics, Aurora, Ill.). The polishing parameters were as follows: 13.79 kPa (2 psi) down force, 47 rpm platen speed, 50 rpm head speed, and 120 mL/min polishing composition flow. Following polishing, the removal rate of the polymer was determined in A/min. The results are summarized in Table 1.

TABLE 1

Polymer Removal Rate as a Function of Metal Ion and Ligand Types

| Polishing Composition | Metal Ion | Ligand | Polymer Polishing Rate (Å/min) |
|---|---|---|---|
| 1A (comparative) | $Al^{3+}$ | — | 100 |
| 1B (inventive) | $Al^{3+}$ | picolinic acid | 1145 |
| 1C (comparative) | $Fe^{3+}$ | — | 68 |
| 1D (inventive) | $Fe^{3+}$ | picolinic acid | 1200 |
| 1E (comparative) | $Cu^{2+}$ | — | 40 |
| 1F (inventive) | $Cu^{2+}$ | picolinic acid | 260 |
| 1G (comparative) | — | picolinic acid | none |

These results demonstrate that the combination of a metal ion that is a Lewis Acid (e.g., $Al^{3+}$, $Fe^{3+}$, or $Cu^{2+}$) and a ligand that is an aromatic carboxylic acid, an aromatic sulfonic acid, an aromatic acid amide, an amino acid, or a hydroxy-substituted N-heterocycle (e.g., picolinic acid) is particularly effective for polishing substrates comprising a polymer film (e.g., spin-on carbon polymer). In particular, Polishing Composition 1B, comprising $Al^{3+}$ and picolinic acid, exhibited a polymer removal rate of over 1100 Å/min, which is at least 11 times greater than the polymer removal rate of Polishing Composition 1A, which contained $Al^{3+}$ without a ligand. Similarly, Polishing Composition 1D, which contained both $Fe^{3+}$ and picolinic acid, exhibited a polymer removal rate of 1200 Å/min, which is at least 17 times greater than the polymer removal rate of Polishing Composition 1C, which contained $Fe^{3+}$ without a ligand. In addition, Polishing Composition 1F, which contained both $Cu^{2+}$ and picolinic acid, exhibited a polymer removal rate of 260 Å/min, which is at least 6 times greater than the polymer removal rate of Polishing Composition 1E, which contained $Cu^{2+}$ without a ligand. Each of inventive Polishing Compositions 1B, 1D, and 1F was much more effective than polishing composition 1G, which contained picolinic acid without a metal ion that is a Lewis Acid and exhibited no removal.

Example 2

This example demonstrates that the combination of a metal ion that is a Lewis Acid and a ligand that is an aromatic carboxylic acid, an aromatic sulfonic acid, an aromatic acid amide, an amino acid, or a hydroxy-substituted N-heterocycle, effectively removes polymer film while exhibiting minimal (or no) removal of tetraethoxysilane (TEOS).

Spin-on carbon (SoC) polymer wafers and tetraethoxysilane (TEOS) wafers were polished with different polishing compositions using a conventional CMP apparatus. The wafers were polished with nine polishing compositions (Polishing Compositions 2A-2I), as described in Table 2. Polishing Compositions 2B, 2C, 2D, 2G, 2H, and 2I were used to polish SoC polymer wafers, but were not used to polish TEOS wafers. Each of Polishing Compositions 2A-2I contained 0.05 wt. % ceria particles and 5 mM $Fe^{3+}$ in an aqueous carrier, and was adjusted to pH 2.3 as necessary with ammonium hydroxide. Each polishing composition also contained a ligand, as described in Table 2.

The substrates were polished on a Logitech tabletop polisher with an EPIC™ D200 pad (Cabot Microelectronics, Aurora, Ill.). The polishing parameters were as follows: 13.79 kPa (2 psi) down force, 35 rpm platen speed, 32 rpm head speed, and 120 mL/min polishing composition flow. Following polishing, the removal rate of the polymer and TEOS was determined in A/imin. The results are summarized in Table 2.

TABLE 2

Polymer and TEOS Removal Rates as a Function of Ligand Type

| Polishing Composition | Ligand | Polymer Polishing Rate (Å/min) | TEOS Polishing Rate (Å/min) |
| --- | --- | --- | --- |
| 2A (inventive) | picolinic acid | 2000 | 10 |
| 2B (inventive) | isonicotinic acid | 500 | — |
| 2C (inventive) | nicotinic acid | 50 | — |
| 2D (comparative) | pyridine carbonitrile | 50 | — |
| 2E (inventive) | pyridinedicarboxylic acid | 3300 | −10 |
| 2F (inventive) | pyridine sulfonic acid | 3200 | 30 |
| 2G (inventive) | p-toluenesulfonic acid | 625 | — |
| 2H (inventive) | salicylamide | 500 | — |
| 2I (comparative) | pyridine propionic acid | 0 | — |

These results demonstrate that the combination of a metal ion that is a Lewis Acid (e.g., $Fe^{3+}$) and a ligand that is an aromatic carboxylic acid, an aromatic sulfonic acid, an aromatic acid amide, an amino acid, or a hydroxy-substituted N-heterocycle (e.g., picolinic acid, isonicotinic acid, nicotinic acid, pyridinedicarboxylic acid, pyridine sulfonic acid, p-toluenesulfonic acid, or salicylamide) is particularly effective for polishing substrates comprising a polymer film (e.g., spin-on carbon polymer).

These results also demonstrate that ligands that include acid functional groups directly attached to the aromatic ring demonstrate an enhanced removal rate of polymer film compared to ligands that include remote acid functional groups (compare, for example, the polymer removal rate of Polishing Composition 2I, which includes a ligand having a remote acid functional group, to the polymer removal rates of Polishing Compositions 2A, 2B, and 2C, which include ligands having acid functional groups directly attached to the aromatic ring).

These results further demonstrate that the polishing compositions of the invention effectively remove polymer film while minimizing or preventing the removal of other layers of a substrate, such as TEOS. For example, Polishing Composition 2A exhibited a polymer removal rate of 2000 Å/min, but a TEOS removal rate of only 10 Å/min. Similarly, Polishing Compositions 2E and 2F exhibited polymer removal rates of 3300 Å/min and 3200 Å/min, respectively, but exhibited TEOS removal rates of −10 Å/min and 30 Å/min, respectively. Desirably, the polishing composition of the invention provides selective polishing of polymer films, by exhibiting useful removal rates for polymer film while minimizing the removal of other components that may be included in a substrate, such as TEOS.

Example 3

This example demonstrates that the combination of a metal ion that is a Lewis Acid and a ligand that is an aromatic carboxylic acid, an aromatic sulfonic acid, an aromatic acid amide, an amino acid, or a hydroxy-substituted N-heterocycle, effectively removes polymer film.

Spin-on carbon (SoC) polymer wafers were polished with different polishing compositions using a conventional CMP apparatus. The wafers were polished with fourteen polishing compositions (Polishing Compositions 3A-3N), as described in Table 3. Each of polishing compositions 3A-3N contained 0.05 wt. % ceria particles and 5 mM $Fe^{3+}$ in an aqueous carrier, and was adjusted to the pH value reported in Table 3 as necessary with ammonium hydroxide. The aqueous carrier for each polishing composition was water. Each polishing composition also contained a ligand, as described in Table 3.

The substrates were polished on a Logitech tabletop polisher with an EPIC™ D200 pad (Cabot Microelectronics. Aurora, Ill.). The polishing parameters were as follows: 13.79 kPa (2 psi) down force, 35 rpm platen speed, 32 rpm head speed, and 120 mL/min polishing composition flow. Following polishing, the removal rate of the polymer was determined in A/min. The results are summarized in Table 3.

TABLE 3

Polymer Removal Rates as a Function of Ligand Type and pH

| Polishing Composition | Ligand | Polishing Composition pH | Polymer Polishing Rate (Å/min) |
| --- | --- | --- | --- |
| 3A (inventive) | methylglycine | 2.7 | 350 |
| 3B (inventive) | methylglycine | 3 | 565 |
| 3C (inventive) | phenylglycine | 2.3 | 713 |

TABLE 3-continued

Polymer Removal Rates as a Function of Ligand Type and pH

| Polishing Composition | Ligand | Polishing Composition pH | Polymer Polishing Rate (Å/min) |
|---|---|---|---|
| 3D (inventive) | phenylglycine | 3 | 540 |
| 3E (inventive) | dimethylglycine | 2.6 | 687 |
| 3F (inventive) | dimethylglycine | 3 | 490 |
| 3G (inventive) | aminobenzoic acid | 2.5 | 1140 |
| 3H (inventive) | aminobenzoic acid | 3 | 1238 |
| 3I (inventive) | pipecolinic acid | 2.6 | 265 |
| 3J (inventive) | pipecolinic acid | 3 | 406 |
| 3K (inventive) | pipecolinic acid | 3.5 | 1333 |
| 3L (inventive) | proline | 2.6 | 687 |
| 3M (inventive) | proline | 3 | 355 |
| 3N (inventive) | proline | 3.5 | 1073 |

These results demonstrate that the combination of a metal ion that is a Lewis Acid (e.g., $Fe^{3+}$) and a ligand that is an aromatic carboxylic acid, an aromatic sulfonic acid, an aromatic acid amide, an amino acid, or a hydroxy-substituted N-heterocycle (e.g., methylglycine, phenylglycine, dimethylglycine, aminobenzoic acid, pipecolinic acid, or proline) is particularly effective for polishing substrates comprising a polymer film (e.g., spin-on carbon polymer).

These results also demonstrate that polishing compositions containing a ligand that is an amino acid are particularly effective for polishing polymer film when the pH of the polishing composition is greater than 3, e.g., when the pH of the polishing composition is between 3 and 3.5. For example, the polymer removal rate of Polishing Composition 3I (which has a pH below 3, i.e., 2.6) was less than the polymer removal rate of Polishing Composition 3J (which has a pH of 3), which was less than the polymer removal rate of Polishing Composition 3K (which has a pH of 3.5). Specifically, the polymer removal rate of Polishing Composition 3K was more than 3 times greater than the polymer removal rate of Polishing Composition 3J, and was more than 5 times greater than the polymer removal rate of Polishing Composition 3I.

Similarly, the polymer removal rate of Polishing Composition 3L (which has a pH below 3, i.e., 2.6) was less than the polymer removal rate of Polishing Composition 3N (which has a pH of 3.5). The polymer removal rate of Polishing Composition 3M (which has a pH of 3) was also less than the polymer removal rate of Polishing Composition 3N. In particular, the polymer removal rate of Polishing Composition 3N was almost 3 times greater than the polymer removal rate of Polishing Composition 3M, and was significantly greater than the polymer removal rate of Polishing Composition 3L.

Example 4

This example demonstrates that the combination of a metal ion that is a Lewis Acid and a ligand that is an aromatic carboxylic acid, an aromatic sulfonic acid, an aromatic acid amide, an amino acid, or a hydroxy-substituted N-heterocycle effectively removes polymer film while exhibiting minimal (or no) removal of oxide (e.g., silicon dioxide ($SiO_2$)).

Spin-on carbon (SoC) polymer wafers, a vapor-deposited polyimide wafer, and silicon dioxide ($SiO_2$) wafers were polished using a conventional CMP apparatus.

In particular, four polishing compositions (Polishing Compositions 4A-4D) were used to polish eight substrates, described in Table 4. Each of Polishing Compositions 4A-4D contained 0.05 wt. % ceria particles, 5 mM $Fe^{3+}$, and 10 mM picolinic acid in an aqueous carrier, and was adjusted to pH 2.3 as necessary with ammonium hydroxide. Polishing Compositions 4A-4C were used to polish three different spin-on carbon (SoC) polymer wafers, as well as silicon dioxide ($SiO_2$) wafers. Polishing Composition 4I) was used to polish a vapor-deposited polyimide polymer wafer and an $SiO_2$ wafer.

Polishing Compositions 4A-4C were used to polish substrates on an Applied Materials 300 mm Reflexion™ polisher with an EPIC™ D200 pad (Cabot Microelectronics, Aurora, Ill.). The polishing parameters with respect to Polishing Compositions 4A-4C were as follows: 6.89 kPa (I psi) down force, 50 rpm platen speed, 47 rpm head speed, and 300 mL/min polishing composition flow. Polishing Composition 4D was used to polish substrates on an Applied Materials 300 mm Reflexion™ polisher with an IC 1010™ pad (Dow Chemical). The polishing parameters with respect to Polishing Composition 4D were as follows: 13.79 kPa (2 psi) down force, 90 rpm platen speed, 85 rpm head speed, and 300 mL/min polishing composition flow. Following polishing, the removal rate of the various SoC polymers and $SiO_2$ was determined in Å/min. The results are summarized in Table 4.

TABLE 4

Polymer and Oxide Removal Rates

| Polishing Composition | Polymer Type | Polymer Polishing Rate (Å/min) | $SiO_2$ Polishing Rate (Å/min) |
|---|---|---|---|
| 4A (inventive) | spin-on carbon | 2735 | 2 |
| 4B (inventive) | spin-on carbon | 1071 | 1 |
| 4C (inventive) | spin-on carbon | 1450 | 2 |
| 4D (inventive) | vapor-deposited polyimide | 1200 | 0 |

These results demonstrate that the combination of a metal ion that is a Lewis Acid (e.g., $Fe^{3+}$) and a ligand that is an aromatic carboxylic acid, an aromatic sulfonic acid, an aromatic acid amide, an amino acid, or a hydroxy-substituted N-heterocycle (e.g., picolinic acid) is particularly effective for polishing substrates comprising a polymer film (e.g., spin-on carbon polymer films or vapor-deposited polyimide film).

These results further demonstrate that the polishing compositions of the invention effectively remove polymer film while minimizing or preventing the removal of other layers of a substrate, such as oxide layers (e.g., $SiO_2$). In particular, each of Polishing Compositions 4A-4D exhibited polymer removal rates greater than 1000 Å/min, but exhibited essentially no oxide removal rate. Desirably, the polishing composition of the invention provides selective polishing of polymer films, by exhibiting useful removal rates for polymer film while minimizing the removal of other components that may be included in a substrate, such as oxides.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to.") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A chemical-mechanical polishing composition comprising:
   (a) abrasive particles that comprise ceria,
   (b) a metal ion that is a Lewis Acid,
   (c) a ligand that is an aromatic carboxylic acid, an aromatic sulfonic acid, an aromatic acid amide, or a hydroxy-substituted N heterocycle, and
   (d) an aqueous carrier,
   wherein the pH of the chemical-mechanical polishing composition is in the range of about 2 to about 3 and wherein the molar concentration ratio of the metal ion to the ligand is about 1:about 2.

2. The chemical-mechanical polishing composition of claim 1, wherein the abrasive particles consist of ceria, and the chemical-mechanical polishing composition does not comprise other abrasive particles.

3. The chemical-mechanical polishing composition of claim 1, wherein the metal ion is $Fe^{3+}$, $Al^{3+}$, $Cu^{2+}$, $Zn^{2+}$, or a combination thereof.

4. The chemical-mechanical polishing composition of claim 3, wherein the metal ion is $Fe^{3+}$.

5. The chemical-mechanical polishing composition of claim 3, wherein the metal ion is $Al^{3+}$.

6. The chemical-mechanical polishing composition of claim 1, wherein the ligand is picolinic acid, isonicotinic acid, nicotinic acid, pyridinedicarboxylic acid, pyridine sulfonic acid, p-toluenesulfonic acid, salicylamide, aniline sulfonic acid, phenylglycine, aminobenzoic acid, pipecolinic acid, 2 hydroxypyridine, 8 hydroxyquinoline, 2-hydroxyquinoline, or a combination thereof.

7. The chemical-mechanical polishing composition of claim 6, wherein the ligand is picolinic acid.

8. The chemical-mechanical polishing composition of claim 1, wherein the chemical-mechanical polishing composition does not contain a peroxy-type oxidizer.

9. The chemical-mechanical polishing composition of claim 1, wherein the chemical-mechanical polishing composition comprises abrasive particles at a total concentration of about 0.01 wt. % to about 1 wt. %.

10. The chemical-mechanical polishing composition of claim 9, wherein the chemical-mechanical polishing composition comprises abrasive particles at a total concentration of about 0.01 wt. % to about 0.05 wt. %.

11. The chemical-mechanical polishing composition of claim 1, wherein the chemical-mechanical polishing composition comprises one or more metal ions that are Lewis Acids at a total concentration of about 0.05 mM to about 50 mM.

12. The chemical-mechanical polishing composition of claim 1, wherein the chemical-mechanical polishing composition comprises one or more ligands that are aromatic carboxylic acids, aromatic sulfonic acids, aromatic acid amides, or hydroxy-substituted N heterocycles at a total concentration of about 0.1 mM to about 100 mM.

13. A method of polishing a substrate comprising:
   (i) providing a substrate;
   (ii) providing a polishing pad;
   (iii) providing the chemical-mechanical polishing composition of claim 1;
   (iv) contacting the substrate with the polishing pad and the chemical-mechanical polishing composition; and
   (v) moving the polishing pad and the chemical-mechanical polishing composition relative to the substrate to abrade at least a portion of the substrate to polish the substrate.

* * * * *